United States Patent
Nash et al.

(10) Patent No.: US 9,449,374 B2
(45) Date of Patent: Sep. 20, 2016

(54) SYSTEM AND METHOD FOR MULTI-FRAME TEMPORAL DE-NOISING USING IMAGE ALIGNMENT

(71) Applicant: QUALCOMM Incorporated, San Diego, CA (US)

(72) Inventors: James Wilson Nash, San Diego, CA (US); Kalin Mitkov Atanassov, San Diego, CA (US)

(73) Assignee: QUALCOMM Incoporated, San Diego, CA (US)

( * ) Notice: Subject to any disclaimer, the term of this patent is extended or adjusted under 35 U.S.C. 154(b) by 65 days.

(21) Appl. No.: 14/216,630

(22) Filed: Mar. 17, 2014

(65) Prior Publication Data
US 2015/0262341 A1    Sep. 17, 2015

(51) Int. Cl.
| | |
|---|---|
| *G06T 5/00* | (2006.01) |
| *H04N 5/217* | (2011.01) |
| *H04N 5/232* | (2006.01) |
| *H04N 5/351* | (2011.01) |

(Continued)

(52) U.S. Cl.
CPC ............ *G06T 5/003* (2013.01); *G06T 3/0006* (2013.01); *G06T 5/002* (2013.01); *G06T 5/50* (2013.01); *H04N 5/217* (2013.01); *H04N 5/23229* (2013.01); *H04N 5/23232* (2013.01); *H04N 5/23267* (2013.01); *H04N 5/23277* (2013.01); *H04N 5/351* (2013.01); *H04N 5/374* (2013.01); *G06T 2207/20182* (2013.01); *G06T 2207/20201* (2013.01); *G06T 2207/20216* (2013.01); *G06T 2207/20221* (2013.01)

(58) Field of Classification Search
CPC .......... H04N 5/23222; H04N 5/2355; H04N 5/23277; H04N 5/35572; H04N 5/35581; G06T 3/0006; G06T 3/0075; G06T 2207/20212–2207/20221; G06T 7/0024–7/0038; G06T 5/003; G06T 3/0068–3/0081

See application file for complete search history.

(56) References Cited

U.S. PATENT DOCUMENTS

| | | | |
|---|---|---|---|
| 7,746,382 | B2 | 6/2010 | Soupliotis et al. |
| 8,036,263 | B2 | 10/2011 | Wang et al. |

(Continued)

FOREIGN PATENT DOCUMENTS

| | | |
|---|---|---|
| EP | 1933271 A1 | 6/2008 |
| EP | 2219366 A1 | 8/2010 |

OTHER PUBLICATIONS

Sunkavalli K., et al., "Video Snapshots: Creating High-Quality Images from Video Clips," IEEE Transactions on Visualization and Computer Graphics, Nov. 2012, vol. 18 (11), pp. 1868-1879.

(Continued)

*Primary Examiner* — Paul Berardesca
(74) *Attorney, Agent, or Firm* — Knobbe, Martens, Olson & Bear LLP; James R. Gambale, Jr.

(57) ABSTRACT

Methods, devices, and computer program products for multi-frame termporal de-noising using image alignment are describe. In one aspect, a method of capturing an image using a multi-frame temporal de-noising is described. The method includes capturing a plurality of frames and aligning the captured plurality of frames with each other. The method further includes determining a subset of frames of the captured plurality of frames, the subset determined based upon a focus quality of each frame of the plurality of frames. Finally, the method includes combining the subset of frames into a single image using a motion filter to reduce blurriness and ghosting.

30 Claims, 3 Drawing Sheets

(51) Int. Cl.
*H04N 5/374* (2011.01)
*G06T 5/50* (2006.01)
*G06T 3/00* (2006.01)

(56) References Cited

U.S. PATENT DOCUMENTS 8,164,636 B1   4/2012  Linzer
8,369,417 B2   2/2013  Au et al.
8,532,421 B2*  9/2013  Wang et al. .................. 382/255
2006/0187346 A1*  8/2006  Soupliotis .......... H04N 5/23248
                                                                 348/452
2008/0112644 A1   5/2008  Yokohata et al.
2008/0170126 A1   7/2008  Tico et al.
2010/0165122 A1   7/2010  Castorina et al.
2015/0195464 A1*  7/2015  Sharma ................ H04N 5/3537
                                                                 348/217.1

OTHER PUBLICATIONS

International Search Report and Written Opinion—PCT/US2015/018007—ISA/EPO—May 12, 2015.

* cited by examiner

SYSTEM AND METHOD FOR MULTI-FRAME TEMPORAL DE-NOISING USING IMAGE ALIGNMENT

FIELD

The present application relates generally to digital imaging, and more specifically to systems, methods, and devices for multi-frame temporal de-noising using image alignment.

BACKGROUND

In digital imaging, a complementary metal-oxide-semiconductor (CMOS) sensor may be used to capture images. However, due to size and power constraints, on a number of digital devices, the physical size of the CMOS sensor may be small while the number of pixels on the sensor may be relatively high. Thus, each individual pixel on the CMOS sensor may be relatively small. The small size of pixels on such a sensor may lead to difficulties in capturing sharp, bright, noise-free images in low-light situations. For example, using a short exposure time with such small pixels may lead to an image that is sharp, but is also both dark and noisy. Meanwhile, using a long exposure time may increase the brightness of the image and reduce noise, but may also lead to blurriness in the resulting image due to motion of objects in the image as well as jittering of the device used to capture the image. This may be especially problematic when using a handheld device, or when capturing images that include moving objects. Accordingly, systems and methods for capturing bright, noise-free, and sharp images in low-light situations are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include multi-frame temporal de-noising using image alignment.

In some aspects, an electronic device for capturing an image using a multi-frame temporal de-noising is disclosed. In certain embodiments, the device includes a memory component configured to store frames of image data each frame having a plurality of pixels and an electronic image sensor coupled to the memory component, the image sensor configured to capture image data comprising a plurality of pixels. The device further includes a processor in data communication with the memory component and the image sensor configured to capture a plurality of frames of image data using the image sensor and store the plurality of frames in the memory component, process the captured plurality of frames to align the plurality of frames with each other, determine a subset of frames of the plurality of frames, the subset determined based upon a focus quality of each frame of the plurality of frames, and combine the subset of frames into a single image using a motion filter to reduce blurriness and ghosting.

In one aspect, a method of capturing an image using a multi-frame temporal de-noising is disclosed. The method includes capturing a plurality of frames of image data using an image sensor and storing the plurality of frames in a memory, processing the captured plurality of frames to align the plurality of frames with each other, determining a subset of frames of the plurality of frames, the subset determined based upon a focus quality of each frame of the plurality of frames, and combining the subset of frames into a single image using a motion filter to reduce blurriness and ghosting.

In one aspect, an electronic device for capturing an image using a multi-frame temporal de-noising is disclosed. The device includes means for capturing a plurality of frames, means for storing the captured plurality of frames, means for processing the captured plurality of frames to align the plurality of frames with each other, means for determining a subset of frames of the plurality of frames, the subset determined based upon a focus quality of each frame of the plurality of frames, and means for combining the subset of frames into a single image using a motion filter to reduce blurriness and ghosting.

In one aspect, a non-transitory computer storage that stores executable program instructions that direct a wireless communications device to perform a process is disclosed. The process includes capturing a plurality of frames of image data using an image sensor and storing the plurality of frames in a memory, processing the captured plurality of frames to align the plurality of frames with each other, determining a subset of frames of the plurality of frames, the subset determined based upon a focus quality of each frame of the plurality of frames, and combining the subset of frames into a single image using a motion filter to reduce blurriness and ghosting.

DETAILED DESCRIPTION

Embodiments relate to systems, methods, and devices for multi-frame temporal de-noising of one or more images, using image alignment on the multiple frames.

Many types of digital imaging devices have very small apertures and pixels. For example, cameras on cell phones and other mobile devices may be limited by size and power constraints. Accordingly, these devices may include a relatively large number of pixels in a relatively small area and may have a small aperture as well. Thus, due to this small size, less light may be able to reach an image sensor in such a device than would reach an image sensor in a larger device, for example, in a digital single-lens reflex camera. This issue may be especially noticeable for images captured in lower-light situations, for example, images taken at night or in dimly-lit locations.

In low-light scenarios, altering an exposure time used for capturing the image may allow the capture of either a sharp but noisy image using a short exposure time, or a clean but blurry image using a long exposure time. In many circumstances, it may be desirable to capture an image using a digital imaging device that is sharp and clean but not blurry and noisy.

Spatial de-noising may be used to create a sharper, cleaner image. For example, wavelets and Block-matching and three dimensional (3D) filtering (BM3D) techniques may be used for spatial de-noising. These techniques work by a method known as "shrinkage" in which small coefficients within the image are discarded. While this technique can eliminate some noise from an image, it also results in the loss of fine detail. This is because fine detail and noise may be of the same order in an image, and thus, the detail may be lost along with the noise, especially in low light conditions (which create a low signal-to-noise ratio in the image), and on live textures such as faces and skin. Further, spatial de-noising techniques often produce artifacts in the resulting "de-noised" image due to the non-linear nature of the particular shrinkage process used for spatial de-noising. Accordingly, spatial de-noising techniques may present a trade-off between noise reduction and detail preservation. In many implementations, a method for cleaner, sharper images with fewer artifacts and more detail is desired.

In order to create higher-quality images, multiple frames may be combined or "stacked" to form a single frame. Generally, the physical noise in each pixel of an image is uncorrelated with the physical noise in the same pixel in a preceding or subsequent image. Accordingly, when multiple frames are taken in succession, the noise in each frame will not be correlated with the noise in other frames. Thus, when the frames are combined using, for example, an averaging of the pixel values for each frame, this averaging process may reduce the noise in the resulting image. This reduction in noise power may be proportionate to the number of frames that are used to produce a de-noised image. For example, if two frames are combined into a single frame, this combined single frame may have half as much noise as each of the four frames individually.

However, one issue with averaging a number of frames is that averaging a number of frames may result in blurriness and loss of details due to random hand jittering and panning. For example, unless a camera is completely stationary (for example, on a tripod), the camera may move at least a small amount between each of a number of sequential shots. Thus, while averaging may help reduce noise, the difference in camera position and angle in each frame may introduce problems into a combined image. Further, transform domain de-noising may also result in blocky artifacts and be computationally expensive. In order to minimize these negative effects, each frame may be aligned with each other prior to the frames being combined to provide temporal de-noising as a precursor to spatial de-noising. In this manner the threshold for truncation of the transform coefficients may be enlarged to allow improved separation between the noise and desired signal spaces.

A number of different methods may be used to align each frame with each other. For example, a six-parameter affine fit may be used to align the frames prior to averaging. Simpler, or more complex, processes may also be used. Such frame alignment may reduce or eliminate temporal blur that would otherwise be caused by jittering and panning of the camera.

In addition to aligning each frame, it may be beneficial to use only the most highly focused frames for frame stacking or averaging. For example, a three-frame sequential affine fit may be used to measure focus quality of each image, and only the most highly focused frames may be used for frame stacking or averaging. Using only the most focused frames may result in a final image that is less blurry than an image created using all frames. This method provides superior results to high pass filter power aggregation.

In addition to frame stacking or averaging, a motion filter may be used to compensate for moving objects in the images. For example, such a motion filter may replace blurred objects such as moving hands or a face with a sharp reference image, or, for each region of the image, combine only sharp versions of that region of the image. This may reduce noise in the resulting image. Ghosting artifacts may also be eliminated by using reference frame replacement of moving objects. In some aspects, the methods described herein may be constructed in a manner to be versatile, flexible, and scalable. These methods may increase the signal-to-noise ratio of the combined image to a point where a less aggressive shrinkage threshold may be used. This may preserve details that would otherwise be lost. This method may be used for video de-noising, and for reducing the noise amplification that is inherent in high dynamic range (HDR) tone mapping.

Figure 1:
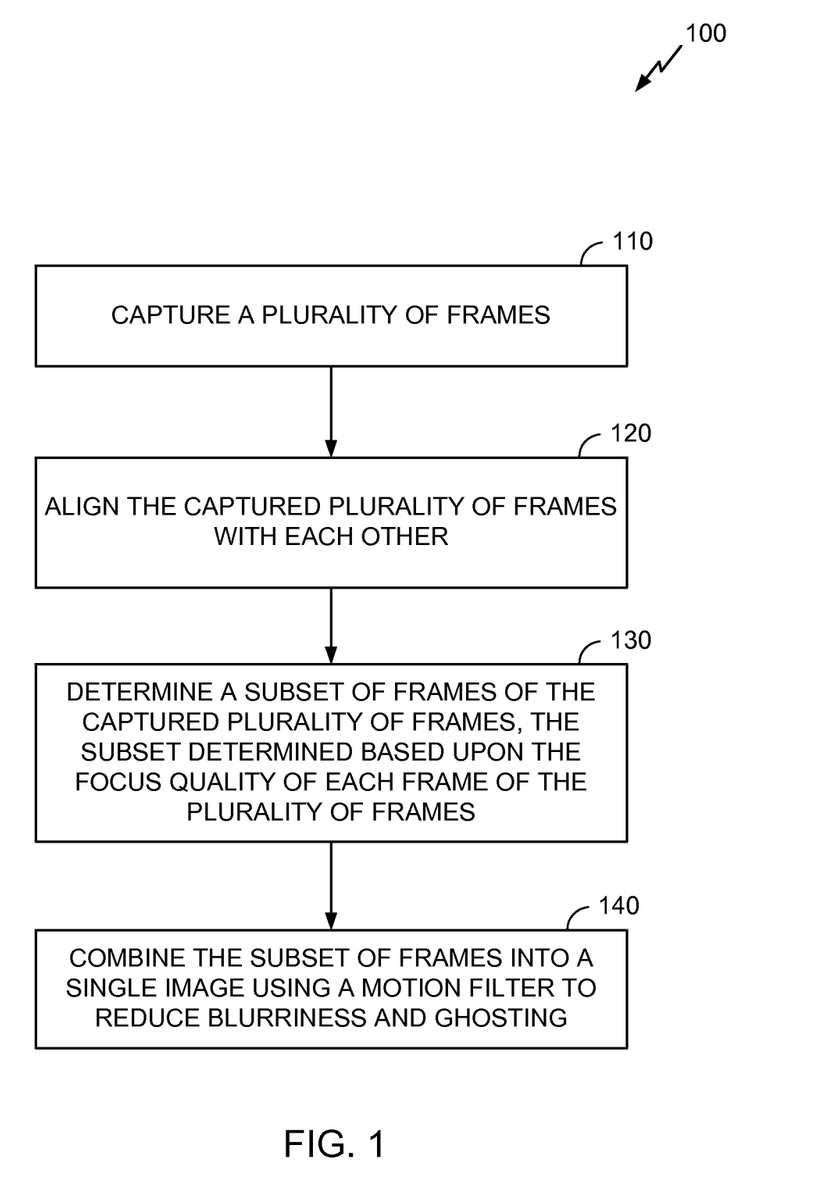
FIG. 1 illustrates an exemplary method for capturing an image using multi-frame temporal de-noising.

FIG. 1 illustrates an exemplary method for capturing an image using multi-frame temporal de-noising. This method may be executed by an electronic device, such as a digital camera or the camera and associated circuitry on a cell phone.

At block 110, a plurality of frames are captured. For example, this plurality of frames may include a plurality of frames taken as a similar time, such as sequentially, on a single device. These frames may each be taken using the entire sensor of the device, or each frame may be taken using only a portion of the pixels of the sensor. In some aspect, each of the plurality of frames may have a similar exposure length and may be of a similar resolution.

Still referring to FIG. 1, at block 120, the captured plurality of frames are aligned with each other. For example, an affine fit, for example a six-parameter affine fit, may be used to align each of the plurality of frames with each other. For example, this alignment may include an affine registration that is an approximation to an actual 8-parameter projective transform, which accounts for the physical mapping of a point in 3D space onto the image plane. However, rather than using eight parameters, six may be used in order to simplify the calculations needs. Using a reduced number of parameters in this way may still be accurate for small viewpoint changes, such as those which may be causes by hand jitter or panning as the camera captures images at a high frame rate. These affine parameters include a rotation angle in the plane of the image, two orthogonal translation coordinates, two scaling parameters to account for anisotropic scaling, and a shearing parameter that accounts for axis tilt. This is further described in references to FIG. 3. Aligning the frames prior to combining the frames may reduce blurriness in the resulting image, and accordingly, may improve image quality. In other embodiments, different processes may be used to align multiple images that are captured from the same (or nearly so) imaging location and/or having the same (or nearly so) image capture characteristics (for example, field of view).

At block 130, a subset of frames is determined from the captured plurality of frames. The frames in the subset of frames are determined based upon the focus quality of each frame of the plurality of frames. Portions of this process seek to improve image fidelity by selecting the highest visual quality frame as a reference frame and, if sufficient frames are available, using only high-quality frames contained in the stack buffer to construct the final image. In some aspects, heuristic logic may be used to determine how many frames are used, and which subset of those frames is used. This may depend, at least in part, on the light level and/or user preference chosen between emphasizing detail preservation or noise reduction. In order to determine the focus quality of a frame, a sequential affine fit may be calculated between the center frame of a series of frames and its adjacent nearest neighbors. The sequential affine fit may be repeated over a rolling window on the stack. For example, as more frames are captured and added to the stack, the older frames in the stack may be taken out of the stack. Thus, the center frame in the stack may change, as newer frames are added and older frames are removed. Thus, the same affine fit may be used not only for registration of frames (such as alignment of frames), but also for image quality selection. In some aspects, using this method to determine focus quality may be preferable to measuring high-frequency energy in the images, to determine the speed and abruptness of color transitions from pixel-to-pixel. For example, the affine method described above may yield superior results to measuring high-frequency energy.

Other methods may also be used to measure blurriness. For example, for each frame either an absolute or a relative metric of blurriness may be calculated. For example, for each frame, a determination may be made whether the frame is more or less blurry than some absolute threshold, or the frame's blurriness may be compared to other frames within the plurality of frames Based on this determination of focus quality of each frame, a subset of frames may be determined, where the subset includes only the frames which are the least blurry. For example, the subset of the frames may comprise a predefined percentage of the frames. For example, a blurriness metric may be calculated for each of the frames, and based on this metric, 50% of the frames may be chosen, based on being the less blurry half of the frames. In some aspects, other proportions of the frames may also be chosen, such as the least blurry 25%, 40%, 60%, or 75% of the frames. In some aspects, the number of frames chosen for the subset of the frames may be a fixed number of frames. For example, the least blurry, 5, 10, 15, or 20 frames may be chosen for this subset.

At block 140 in FIG. 1, the subset of frames may be combined into a single image using a motion filter to reduce blurriness and ghosting. This is further described in references to FIG. 3. In some examples, each of the least blurry frames in the subset of frames may be analyzed. A motion filter may be used to determine if any objects in the frames are moving, and therefore in a different position in some frames relative to other frames. If an object in the frame is moving, the motion filter may be used to replace the moving object in some frames with the same object from a reference frame in a reference position. This motion detection filter may have two purposes: First, the filter may be used to identify motion that is distinct from the background affine warp. That is, the filter may be used to identify objects in the image which are moving, distinct from the motion of all objects due to panning and jittering of the camera while multiple frames are being captured. Second, the filter may yield the possibility of replacing a blurred area or object by the sharp area or object in the reference frame. For example, if an object in the frame is found to be moving, such as a person waving their hand, the hand motion may be detected, and the moving image of the hand in some frames may be replaced by the image of the hand in a reference frame. Thus, each frame may then contain the same image of the moving hand, which may reduce blurriness or ghosting of the image of the hand, in a final image.

A number of different motion filters may be used to achieve the above effects. For example, a motion filter may use keypoint motion vectors, which have different motion characteristics relative to the keypoint constellation in the affine frame registration. For example, this filter may compare a number of different keypoints and their location relative to each other in a captured frame as compared to a reference frame. In this way, objects which have undesirable local motion properties can be detected, such as a fan, a waving hand, a turning face, a blinking eye, moving cars, walking people, and so on.

Another motion detection filter may be based on computing a special function of the intensity difference image between two frames. This function is selected to have a sigmoid shape, but which weights the differences according to an intensity profile in a reference image. The main purpose of this function is to guard against catastrophic motion between two frames and to eliminate ghosting artifacts. This may allow noise reduction in low intensity areas, while simultaneously preserving detail in high-intensity areas. This performance may be in accordance with human visual preferences, which may focus on detail in high-intensity areas.

After using such a motion filter, the frames may be combined with each other. For example, the frames may be combined by simply averaging the values for each individual pixel of the image. In some aspects, a weighted average may be used. The weight may be based, for example, on the blurriness of each image, or based on the temporal proximity to a certain point. For example, if ten frames are to be combined and each frame was taken sequentially, the frames in the middle of the sequence may be weighted higher than that frames at either the beginning or the end of the sequence.

Figure 2:
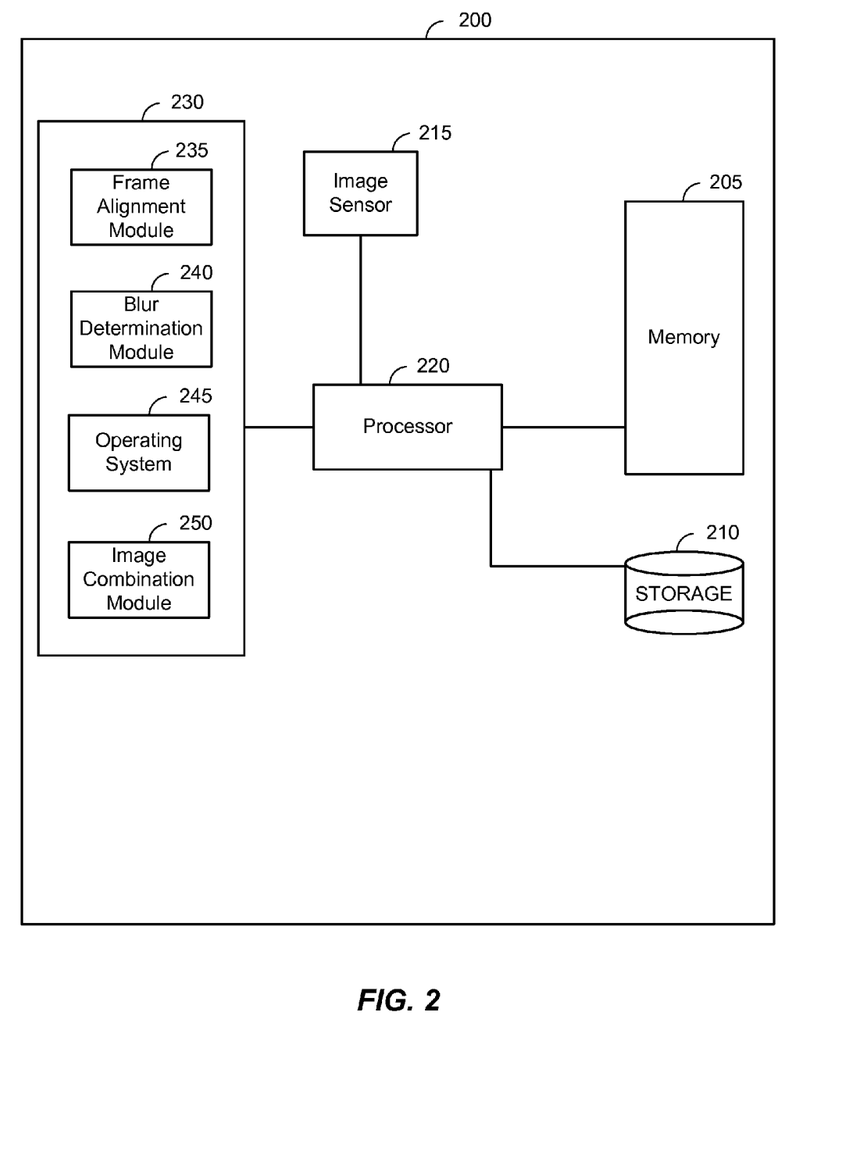
FIG. 2 depicts a high-level block diagram of a device having a set of components including a processor operatively coupled to an image sensor.

FIG. 2 depicts a high-level block diagram of a device 200 having a set of components including a processor 220 operatively coupled to an image sensor 215. A working memory 205, storage 210, and memory 230 are also in communication with and operative attached to the processor. Device 200 may be a device configured to take digital photograhs and/or videos, such as a digital camera, a cell phone, or another device.

The image sensor 215 may be configured to capture a number of pixels of an image. Any number of such pixels may be included on the device 200. The pixels on an image sensor may be arranged in a number of rows and columns, in order to form a grid. The image sensor 215 can be, for example, a charge-coupled device (CCD), a complementary metal-oxide semiconductor (CMOS) sensor, or the like. The image sensor 215 may be coupled to the processor (or "image processor") 220 to transmit a captured image to the processor 220. The processor 220 may be configured to perform various operations on a received captured image in order to create an output image.

Processor 220 may be a general purpose processing unit or a processor specially designed for the disclosed methods. As shown, the processor 220 is connected to a memory 230 and a working memory 205. In the illustrated embodiment, the memory 230 stores frame alignment module 235, blur determination module 240, image combination module 250, and operating system 245. These modules include instructions that configure the processor to perform various tasks. Working memory 205 may be used by processor 220 to store a working set of processor instructions contained in the modules of memory 230. Alternatively, working memory 205 may also be used by processor 220 to store dynamic data created during the operation of device 200.

As mentioned above, the processor 220 is configured by several modules stored in the memories. For example, the frame alignment module 235 may include instructions that configure the processor 220 to align two or more frames with each other, where those two or more frames were captured with the image sensor 215. For example, the frame alignment module 235 may contain instructions which enables to processor 220 to recognize certain portions on each of a number of captured images, and thus to align the captured images with each other using at least one or more recognized portions of those images with correspond to the same portions of other captured images.

The memory 230 may also contain a blur determination module 240. The blur determination module 240 may contain instructions that configure the processor 220 to identify whether images contained in the memory 205 are blurry or not. For example, as discussed above, the blur determination module 240 may calculate an absolute or relative threshold of blurriness for the image, in order to determine whether a particular image is blurry or not. In some aspects, the blur determination module 240 may be configured to classify images based on a binary blurriness classification, where the images have been outputted from the frame alignment module 235.

The memory 230 may also contain an image combination module 250. The image combination module 250 may be configured to receive a number of images from the blur determination module 240 or from the memory 205, and may contain instructions sufficient to allow the processor 220 to combine the images into a single image. In some aspects, the image combination module 250 may contain instructions sufficient to allow the processor 220 to use a motion filter in combining the number of images into a single image.

Operating system module 245 configures the processor to manage the memory and processing resources of device 200. For example, operating system module 245 may include device drivers to manage hardware resources such as the image sensor 215 or storage 210. Therefore, in some embodiments, instructions contained in modules discussed above may not interact with these hardware resources directly, but instead interact through standard subroutines or APIs located in operating system component 245. Instructions within operating system 245 may then interact directly with these hardware components.

Processor 220 may write data to storage module 210. While storage module 210 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 2 depicts a device having separate components to include a processor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 2 shows two memory components, to include memory component 230 having several modules, and a separate memory 205 having a working memory, one with skill in the art would recognize several embodiments utilizing different memory architectures. For example, a design may utilize ROM or static RAM memory for the storage of processor instructions implementing the modules contained in memory 230. Alternatively, processor instructions may be read at system startup from a disk storage device that is integrated into device 200 or connected via an external device port. The processor instructions may then be loaded into RAM to facilitate execution by the processor. For example, working memory 205 may be a RAM memory, with instructions loaded into working memory 205 before execution by the processor 220.

Figure 3:
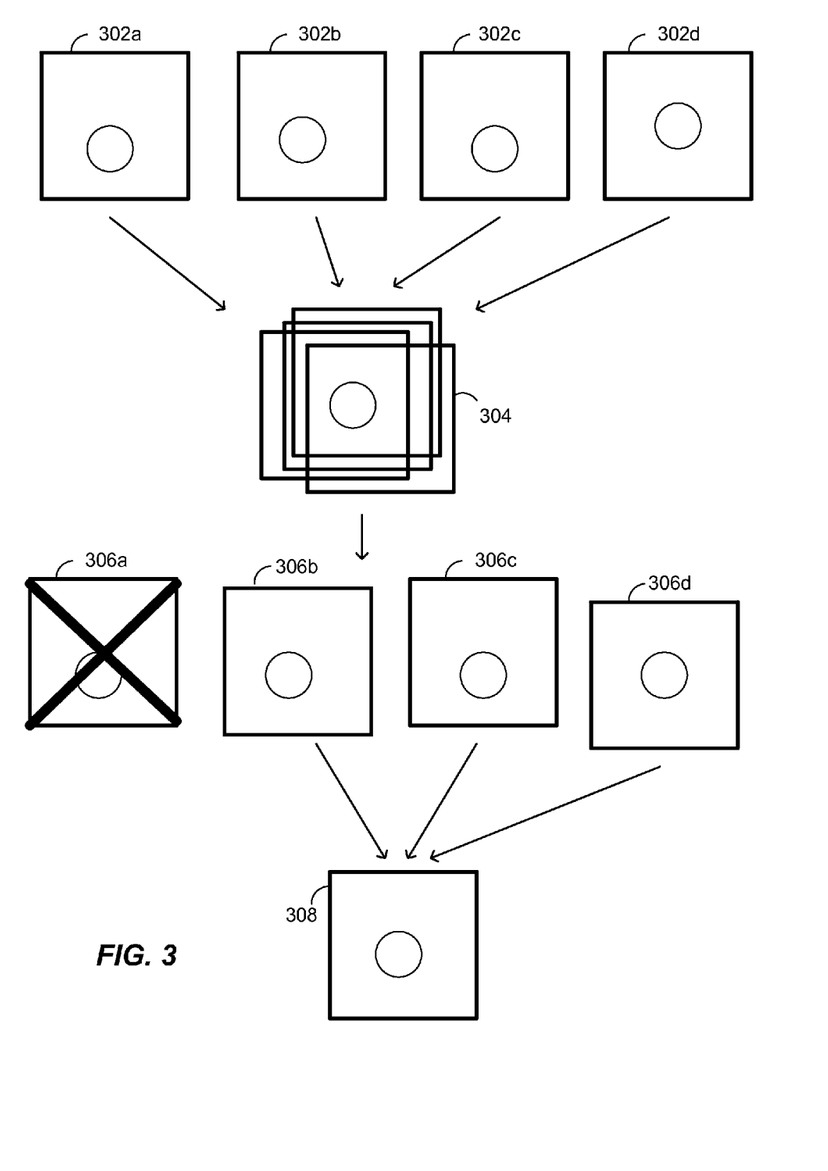
FIG. 3 illustrates a diagram of an example of a method for multi-frame temporal de-noising using image alignment.

FIG. 3 illustrates a diagram of a method for multi-frame temporal de-noising using image alignment. For example, the method begins with four images 302a-d. These images 302a-d may, for example, have been captured sequentially be a single capture device in quick succession. These images 302a-d may contain similar subject matter, here a circle, but the camera may have moved somewhat during the taking of the images, due to panning or jittering of a hand which may have been holding the camera during the time the images were captured.

Accordingly, to account for this hand panning and jittering, the four images 302a-d may be aligned with each other, as in aligned images 304. As described above, a number of different processes can be used to align the images. For example, a six-parameter affine fit may be used, as described above. This may align the objects in the image, and also align the slightly different perspectives from which each of the four images 302a-d was taken.

After this affine fit, a subset of the aligned images may be chosen. For example, each of the aligned images may be numbered from 306a-d, based on the original four images 302a-d. One or more of these aligned images 306a-d may be chosen to be a part of the subset of images that will be combined into final image 308. For example, in this illustration, aligned image 306a was not combined into final image 308, while each of aligned images 306b-d were combined to form final image 308. Aligned image 306a may, for example, represent the blurriest or least in-focus of the four aligned images 306a-d, and may have been excluded for this reason. The blurriness of aligned image 306a may have been discovered the method during, for example, the affine fit used to align the images. For example, during this process, it may be determined that aligned image 306a (and accordingly, image 302a) are out of focus. Thus, image 302a, corresponding to aligned image 306a, may be discarded and not used to form final image 308. It may be advantageous to determine whether or not to discard certain images during the same process as aligning the images. For example, if these decisions are made during the alignment of the frames, this may reduce processing power needed for the combined alignment and blurriness detection, since they may be combined into a single step, rather than require two separate processes.

Finally, the chosen aligned images 306b-d may be combined to form final image 308. This combination may be done by average the pixel values for each of the aligned images 306b-d. In some aspects, portions of one or more of the aligned images 306b-d that are in motion may be detected. These moving portions may be replaced by the same portion of one of the other aligned images 306b-d, in order to prevent the appearance of ghosting in the final image 308. In some aspects, the combination may also use a weighted average. For examples, the weights may be determined based on the temporal distance from the "center" image of the aligned images 306b-d, a similarity between the aligned images 306b-d (so more similar images are weighted more heavily), or based on a focus quality of each of the aligned images 306b-d.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-3 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An electronic device for capturing an image, the device comprising:
   a memory component configured to store frames of image data, each frame having a plurality of pixels;
   an electronic image sensor coupled to the memory component, the image sensor configured to capture frames of image data comprising a plurality of pixels;
   a processor in data communication with the memory component, the processor configured to:
      capture a plurality of frames of image data using the image sensor and store the plurality of frames in the memory component;
      align the plurality of frames with each other by adding a first frame of the stored plurality of frames to a stack and calculating a fit between a first center frame at a center position of the stack and a frame adjacent to the first center frame;
      determine a focus quality of each frame of the plurality of frames during the aligning the plurality of frames;
      determine a subset of frames of the plurality of frames, the subset of frames determined based upon the determined focus quality of each frame of the plurality of frames; and
      combine the subset of frames into a single image using a motion filter to reduce blurriness and ghosting.

2. The device of claim 1, wherein the processor is configured to align the plurality of frames with each other using an affine fit process.

3. The device of claim 2, wherein the affine fit process uses a six-parameter affine fit.

4. The device of claim 2, wherein the processor is further configured to determine:
   the focus quality of each frame of the plurality of frames during the aligning the plurality of frames using the affine fit process; and
   a subset of frames of the plurality of frames by selecting a subset of frames of the captured plurality of frames based upon the determined focus quality of each of the captured plurality of frames.

5. The device of claim 4, wherein the affine fit process is configured to use three sequential frames of the plurality of frames.

6. The device of claim 1, wherein the processor is configured to determine a subset of frames of the captured plurality of frames by selecting a specified number of frames corresponding to the specified number of frames with the highest focus quality.

7. The device of claim 1, wherein the motion filter is configured to replace a blurred object in a captured frame with a sharper version of the object from a reference frame.

8. The device of claim 1, wherein the motion filter is configured to detect blurred portions of a captured frame and not use the blurred portions' to combine the subset of the plurality of frames into a single image.

9. A method of capturing an image, the method comprising:
   capturing a plurality of frames of image data using an image sensor and storing the plurality of frames in a memory;
   processing the captured plurality of frames to align the plurality of frames with each other by adding a first frame of the stored plurality of frames to a stack and calculating a fit between a center frame at a center position of the stack and a frame adjacent to the center frame;
   determining a focus quality of each frame of the plurality of frames during the aligning the plurality of frames;
   determining a subset of frames of the plurality of frames, the subset determined based upon the determined focus quality of each frame of the plurality of frames; and
   combining the subset of frames into a single image using a motion filter to reduce blurriness and ghosting.

10. The method of claim 9, wherein aligning the plurality of frames with each other comprises using an affine fit process.

11. The method of claim 10, wherein the affine fit process uses a six-parameter affine fit.

12. The method of claim 10, wherein determining the focus quality of each of the captured plurality of frames during the aligning the plurality of frames comprises using the affine fit process, and wherein determining the subset of frames of the plurality of frames comprises selecting a subset of frames of the captured plurality of frames based upon the determined focus quality of each of the captured plurality of frames.

13. The method of claim 12, wherein the affine fit process is configured to use three sequential frames of the plurality of frames.

14. The method of claim 9, wherein determining a subset of frames comprises selecting a specified number of frames corresponding to the specified number of frames with the highest focus quality.

15. The method of claim 9, wherein the motion filter is configured to replace a blurred object in a captured frame with a sharper version of the object from a reference frame.

16. The method of claim 9, wherein the motion filter is configured to detect blurred portions of a captured frame and not use the blurred portions to combine the subset of the plurality of frames into a single image.

17. An electronic device for capturing an image, the device comprising:
   means for capturing a plurality of frames;
   means for storing the captured plurality of frames;
   means for processing the captured plurality of frames to align the plurality of frames with each other by adding a first frame of the stored plurality of frames to a stack and calculating a fit between a center frame at a center position of the stack and a frame adjacent to the center frame;
   means for determining a focus quality of each frame of the plurality of frames during the aligning the plurality of frames;
   means for determining a subset of frames of the plurality of frames, the subset determined based upon the determined focus quality of each frame of the plurality of frames; and
   means for combining the subset of frames into a single image using a motion filter to reduce blurriness and ghosting.

18. The device of claim 17, wherein means for processing the captured plurality of frames to align the plurality of frames with each other comprises means for using an affine fit process to align each of the captured frames with each other.

19. The device of claim 18, wherein the affine fit process uses a six-parameter affine fit.

20. The device of claim 18, wherein
the means for determining the focus quality of each frame of the plurality of frames during the aligning the plurality of frames comprises means for using the affine fit process, and wherein
the means for determining a subset of frames of the plurality of frames comprises means for selecting a subset of frames of the captured plurality of frames based upon the determined focus quality of each of the captured plurality of frames.

21. The device of claim 20, wherein the affine fit process is configured to use three sequential frames of the plurality of frames.

22. The device of claim 17, wherein means for determining a subset of frames comprises means for selecting a specified number of frames corresponding to the specified number of frames with the highest focus quality.

23. The device of claim 17, wherein the motion filter is configured to replace a blurred object in a captured frame with a sharper version of the object from a reference frame.

24. The device of claim 17, wherein the motion filter is configured to detect blurred portions of a captured frame and not use the blurred portions to combine the subset of the plurality of frames into a single image.

25. A non-transitory computer storage that stores executable program instructions that direct a wireless communications device to perform a process that comprises:
capturing a plurality of frames of image data using an image sensor and storing the plurality of frames in a memory;
processing the captured plurality of frames to align the plurality of frames with each other by adding a first frame of the stored plurality of frames to a stack and calculating a fit between a center frame at a center position of the stack and a frame adjacent to the center frame;
determining a focus quality of each frame of the plurality of frames based-upon during the aligning the plurality of frames;
determining a subset of frames of the plurality of frames, the subset determined based upon the determined focus quality of each frame of the plurality of frames; and
combining the subset of frames into a single image using a motion filter to reduce blurriness and ghosting.

26. The non-transitory computer storage of claim 25, wherein aligning the plurality of frames with each other comprises using an affine fit process.

27. The non-transitory computer storage of claim 26, wherein the affine fit process uses a six-parameter affine fit.

28. The non-transitory computer storage of claim 26, wherein determining the focus quality of each frame of the plurality of frames is based upon during aligning the plurality of frames using the affine fit process, and wherein determining a subset of frames of the plurality of frames comprises selecting a subset of frames of the captured plurality of frames based upon the determined focus quality of each of the captured plurality of frames.

29. The non-transitory computer storage of claim 25, wherein determining a subset of frames comprises selecting a specified number of frames corresponding to the specified number of frames with the highest focus quality.

30. The device of claim 1, wherein the aligning the plurality of frames further comprises (i) updating the stack via adding a second frame of the stored plurality of frames to the stack and (ii) calculating a fit between a second center frame at the center position of the updated stack and a frame adjacent to the second center frame.

* * * * *